(12) United States Patent
Yamaguchi

(10) Patent No.: US 11,374,245 B2
(45) Date of Patent: Jun. 28, 2022

(54) HYDROGEN INJECTOR FOR FUEL CELL SYSTEM

(71) Applicant: TOYOTA JIDOSHA KABUSHIKI KAISHA, Toyota (JP)

(72) Inventor: Masanori Yamaguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 16/930,616

(22) Filed: Jul. 16, 2020

(65) Prior Publication Data

US 2021/0020973 A1 Jan. 21, 2021

(30) Foreign Application Priority Data

Jul. 18, 2019 (JP) .............................. JP2019-132863

(51) Int. Cl.
*H01M 8/04089* (2016.01)
*H01M 8/04746* (2016.01)

(52) U.S. Cl.
CPC ... *H01M 8/04753* (2013.01); *H01M 8/04089* (2013.01)

(58) Field of Classification Search
CPC ......... H01M 8/04746; H01M 8/04089; H01M 8/04753; H01M 8/04895; H01M 8/2484; Y02E 60/50
See application file for complete search history.

(56) References Cited

U.S. PATENT DOCUMENTS

| 2017/0263959 | A1* | 9/2017 | Hosoi | H01M 8/04664 |
| 2018/0069249 | A1* | 3/2018 | Yoshioka | F16K 31/041 |

FOREIGN PATENT DOCUMENTS

| JP | 2008-140619 | A | 6/2008 |
| JP | 2008140619 | * | 6/2008 |
| JP | 2016-200242 | A | 12/2016 |
| JP | 2016200242 | * | 12/2016 |
| JP | 6532741 | B2 | 6/2019 |

OTHER PUBLICATIONS

JP2008140619 MT (Year: 2008).*

* cited by examiner

*Primary Examiner* — Alexander Usyatinsky
(74) *Attorney, Agent, or Firm* — Sughrue Mion, PLLC

(57) ABSTRACT

A hydrogen injector disclosed herein may include a solenoid valve connected to a hydrogen tank and a controller configured to supply a current to a coil of the solenoid valve. The controller may monitor a rate of change of the current while supplying the current equal to or greater than a first current value. The controller may decrease the current to a second current value which is lower than the first current value upon when the rate of change increases.

4 Claims, 3 Drawing Sheets

HYDROGEN INJECTOR FOR FUEL CELL SYSTEM

CROSS-REFERENCE TO RELATED APPLICATION

This application claims priority to Japanese Patent Application No. 2019-132863, filed on Jul. 18, 2019, the entire contents of which are incorporated herein by reference.

TECHNICAL FIELD

The technology disclosed herein relates to a hydrogen injector used for a fuel cell system. The technology particularly relates to a hydrogen injector of which electric power consumption is reduced.

BACKGROUND

A hydrogen injector is used in a fuel cell system (e.g., Japanese Patent Application Publication No. 2008-140619). The hydrogen injector reduces the pressure of high-pressure hydrogen gas in a hydrogen tank and supplies it to a fuel cell stack.

A hydrogen injector includes a solenoid valve as its main component. The solenoid valve includes a coil configured to move a plunger (valve core) for opening and closing a flow path. The solenoid valve opens when the coil is supplied with a current equal to or greater than a predetermined current value (first current value), whereas it closes when the supply of the current is shut off. The solenoid valve requires a high current to open, but does not require a current that high to keep itself open. Thus, a controller of the solenoid valve firstly opens the solenoid valve by supplying the current equal to or greater than the first current value for a certain period, and then after the certain period has elapsed, the controller decreases the current to a second current value, which is lower than the first current value, to keep the solenoid valve open. Japanese Patent Application Publication No. 2016-200242 describes an example of a sequence of such valve control, Japanese Patent Application Publication No. 2016-200242 describes a solenoid valve for fuel injection.

Japanese Patent Application Publication No. 2016-200242 also describes a technology of checking a solenoid valve. For the solenoid valve of Japanese Patent Application Publication No. 2016-200242, a current flowing in the coil is monitored while a voltage is applied to the coil. When the plunger moves, a time rate of change of the current flowing in the coil exhibits an inflection point. If no inflection points are found in the time rate of change of the monitored current, the controller of the solenoid valve determines that the solenoid valve fails.

SUMMARY

In the solenoid valve described in Japanese Patent Application Publication No. 2016-200242, the supply current is decreased from the first current value to the second current value when a predetermined certain period has elapsed. The solenoid valve starts opening when the current equal to or greater than the first current value flows. After having opened, the solenoid valve is kept open with the current of the second current value. The certain period includes a margin to ensure opening of the solenoid valve. Thus, even after the solenoid valve has opened, the supply of the current of the first current value continues for a while. Such continuous supply of the current of the first current value (>the second current value) after the solenoid valve has opened results in unnecessary electric power consumption. The disclosure herein provides a technology that enables reduction in electric power consumption of a hydrogen injector.

A hydrogen injector disclosed herein may comprise a solenoid valve, connected to a high-pressure hydrogen tank and a controller configured to supply a current to a coil of the solenoid valve. The controller may monitor a rate of change of the current while supplying the current equal to or greater than a first current value. The controller may decrease the current to a second, current value (<the first current value) upon when the rate of change of the current (time rate of change thereof) increases.

When the solenoid valve opens, hydrogen gas, of which pressure has been reduced, is injected. Reducing the pressure of high-pressure hydrogen gas decreases the temperature thereof. The pressure-reduced hydrogen gas cools the solenoid valve (coil). The temperature decrease in the coil decreases the electrical resistance of the coil. When the electrical resistance of the coil decreases during supply of the current equal to or greater than the first current value to the coil, the current increases. In other words, an increase in the rate of change of the current flowing in the coil indicates that the solenoid valve has opened. The hydrogen injector disclosed herein decreases the current to the second current value upon when the rate of change of the current flowing in the coil increases. Monitoring the current enables detection of a timing at which the solenoid valve has opened, and the current is decreased at the timing. Thus, the hydrogen injector disclosed herein can reduce unnecessary electric power consumption.

The details and further improvements of the technology disclosed herein will be described in "DETAILED DESCRIPTION" below.

DETAILED DESCRIPTION

Figure 1:
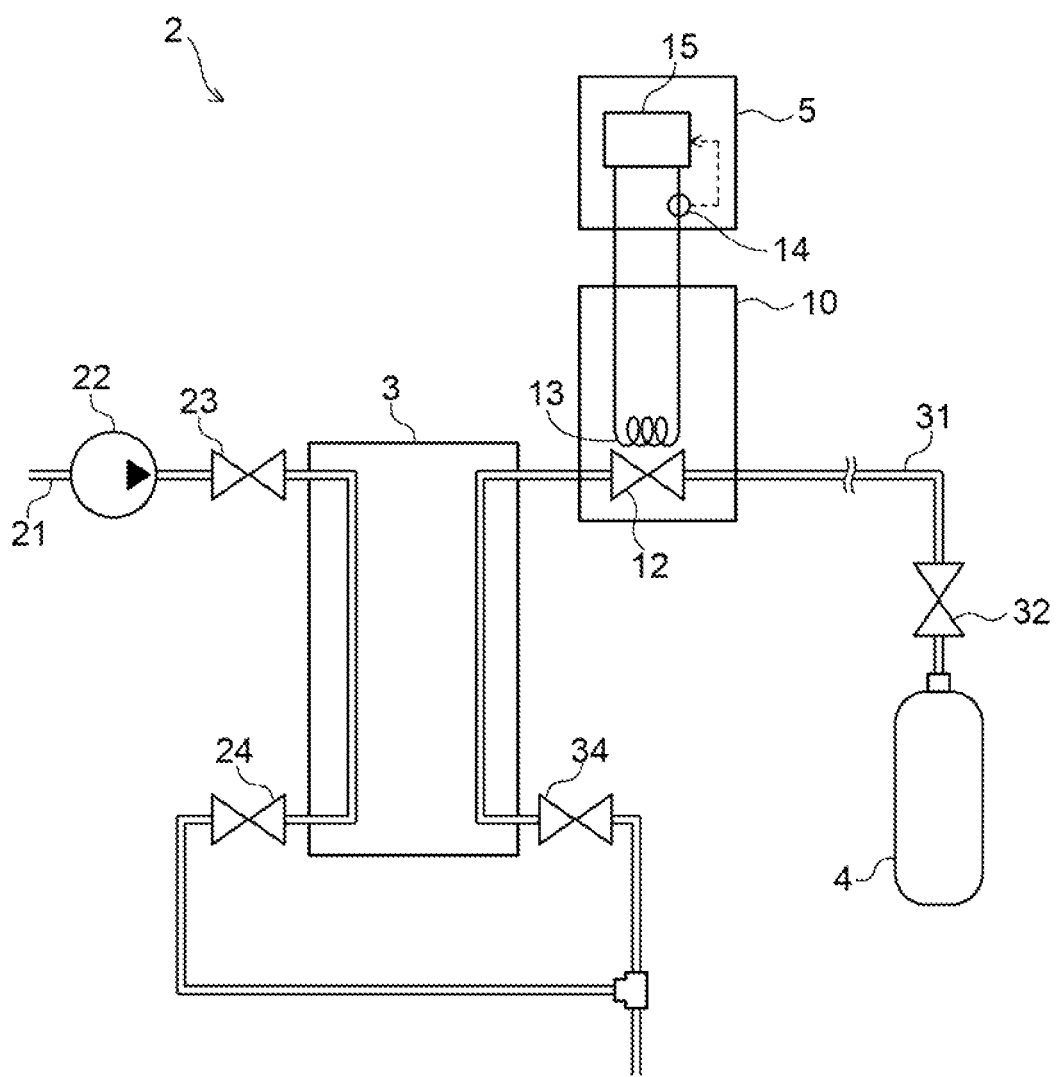
FIG. 1 is a block diagram of a fuel cell system that includes a hydrogen injector of an embodiment.

With reference to the drawings, a hydrogen injector 10 of an embodiment will be described. FIG. 1 shows a block diagram of a fuel cell system 2 that includes the hydrogen injector 10. The fuel cell system 2 includes a fuel cell stack 3, a hydrogen tank 4, a main controller 5, and the hydrogen injector 10.

As is well known, the fuel cell system 2 obtains electric power by a reaction between oxygen and hydrogen. Oxygen gas reacts with hydrogen gas in the fuel cell stack 3, as a result of which electric power is generated.

Oxygen is obtained from an atmosphere. An air pipe 21 and a fuel pipe 31 are connected to the fuel cell stack 3. Oxygen (atmosphere) is taken into the air pipe 21 by an air compressor 22. The air pipe 21 includes a first air valve 23 (pressure-regulating valve), and the first air valve 23 regulates an amount of air to be supplied to the fuel cell stack 3. The air pipe 21 includes a second air valve 24 (pressure-regulating valve) at a portion of the air pipe 21 that exits from the fuel cell stack 3. The second air valve 24 regulates an amount of residual oxygen (residual air) to be exhausted from the fuel cell stack 3.

The fuel pipe 31 connects the fuel cell stack 3 and the hydrogen tank 4. The hydrogen tank 4 stores high-pressure hydrogen gas. The fuel pipe 31 is provided with the hydrogen injector 10. The hydrogen injector 10 reduces the pressure of the high-pressure hydrogen gas in the hydrogen tank 4 to a predetermined pressure and supplies it to the fuel cell stack 3. The hydrogen tank 4 includes a main stop valve 32, and the main stop valve 32 is closed while the fuel cell system 2 is inactive so as to ensure safety. Although the fuel pipe 31 is provided with other devices such as a pressure sensor, illustration and description of these devices are omitted.

The fuel pipe 31 includes an exhaust valve 34 (pressure-regulating valve) at a portion of the fuel pipe 31 that exits from the fuel cell stack 3. The exhaust valve 34 regulates an amount of residual hydrogen gas to be exhausted from the fuel cell stack 3.

The main controller 5 controls the air compressor 22, the first air valve 23, the second air valve 24, the main stop valve 32, the hydrogen injector 10, and the exhaust valve 34. The main controller 5 receives a target power command from a host controller (not shown), and controls the air compressor 22, the hydrogen injector 10, and the like so as to achieve the target power.

The hydrogen injector 10 will be described. As described above, the hydrogen injector 10 reduces the pressure of the high-pressure hydrogen gas and supplies it to the fuel cell stack 3. The hydrogen injector 10 includes a solenoid valve 12 and a coil 13. A current sensor 14 and an injector controller 15, which are for controlling the hydrogen injector 10, are included in the main controller 5.

The solenoid valve 12 has a typical, technically well-known structure, and hence only the outline thereof is described here. The solenoid valve 12 includes a plunger (not shown) configured to open and close a flow path of a pipe (the fuel pipe 31). The plunger may also be termed a valve core. Alternatively, a component configured to open and close a flow path may also be called a valve plate. In the disclosure herein, such a component configured to open and close a flow path is termed a plunger. The plunger is biased by a spring, and closes the flow path while no current is supplied to the coil 13. In other words, the solenoid valve 12 is of a normally-closed type.

The coil 13 is an electromagnetic component. When a predetermined current is supplied to the coil 13, magnetic force generated by the coil causes the plunger to move to a position for opening the flow path. In other words, when a current equal to or greater than a first current value (which may be termed "current of the first current value or greater") is supplied to the coil 13, the solenoid valve 12 opens. The solenoid valve 12 is of a current-driven type.

For convenience of description, a position of the plunger at which the plunger closes the flow path will be termed a closed position, while a position of the plunger at which the plunger opens the flow path will be termed an opened position. While no current. is supplied, the plunger is kept at the closed position by the spring, Moving the plunger from the closed position to the opened position requires supply of a relatively large current (which is equal to or greater than the first current value) to the coil 13. Once the plunger has moved to the opened position, the plunger can be kept at the opened position even when the supply current to the coil 13 is decreased to a second current value (<the first current value).

The supply current to the coil 13 is controlled by the injector controller 15. The injector controller 15 firstly supplies the current of the first current value or greater to the coil 13. Then, upon when the plunger has moved to the opened position (i.e., upon when the solenoid valve 12 has opened), the injector controller 15 decreases the supply current to the coil 13 to the second current value. Decreasing the supply current to the coil 13 to the second current value can reduce electric power consumption required to keep the solenoid valve open.

Conventionally, a time period during which the current of the first current value or greater is supplied is predetermined. For convenience of description, the time period during which the current of the first current value or greater is supplied will be termed a valve activation period. The predetermined valve activation period includes a safety margin. In other words, even after the plunger has moved from the closed position to the opened position, supply of the current of the first current value or greater continues for a while. This supply of current of the first current value or greater after the plunger has moved to the opened position (i.e., after the solenoid valve 12 has opened) is unnecessary. The hydrogen injector 10 of the embodiment detects a timing at which the solenoid valve 12 opens, from the rate of change of the current flowing in the coil 13. Immediately after detecting that the solenoid valve 12 has opened, the hydrogen injector 10 decreases the supply current to the coil 13 to reduce electric power consumption.

How the injector controller 15 detects a timing at Which the solenoid valve 12 opens will he described. As described before., the hydrogen injector 10 is connected to the hydrogen tank 4, and reduces the pressure of the high-pressure hydrogen gas and injects it when opens. Reducing the pressure of the high-pressure hydrogen gas sharply decreases the temperature thereof. Thus, when the solenoid valve 12 opens and the pressure of the hydrogen gas is reduced, the solenoid valve 12 (including the coil 13) is cooled by the hydrogen gas. When the coil 13 is cooled, its electrical resistance decreases. Then, when the electrical resistance of the coil 13 decreases during a constant voltage being applied thereto, the current flowing in the coil 13 increases. In other words, when the solenoid valve 12 opens during a constant voltage being applied to the coil 13, the rate of change of the current flowing in the coil 13 (a change of the current per unit time) increases. The main controller 5 includes the current sensor 14 configured to measure the current flowing in the coil 13. While supplying the current of the first current value or greater, the injector controller 15 monitors, by the current sensor 14, the rate of change of the current flowing in the coil 13. When detecting an increase in the rate of change of the current flowing in the coil 13, the injector controller 15 determines that the solenoid valve 12 has opened. When the rate of change of the current flowing in the coil 13 increases during the supply of the current of the first current value or greater, the injector controller 15 decreases the supply current to the coil 13 to the second current value. As described above, the injector controller 15 can decrease the supply current to the coil 13 immediately after the solenoid valve 12 has opened, and thus can reduce electric power consumption.

Figure 2:
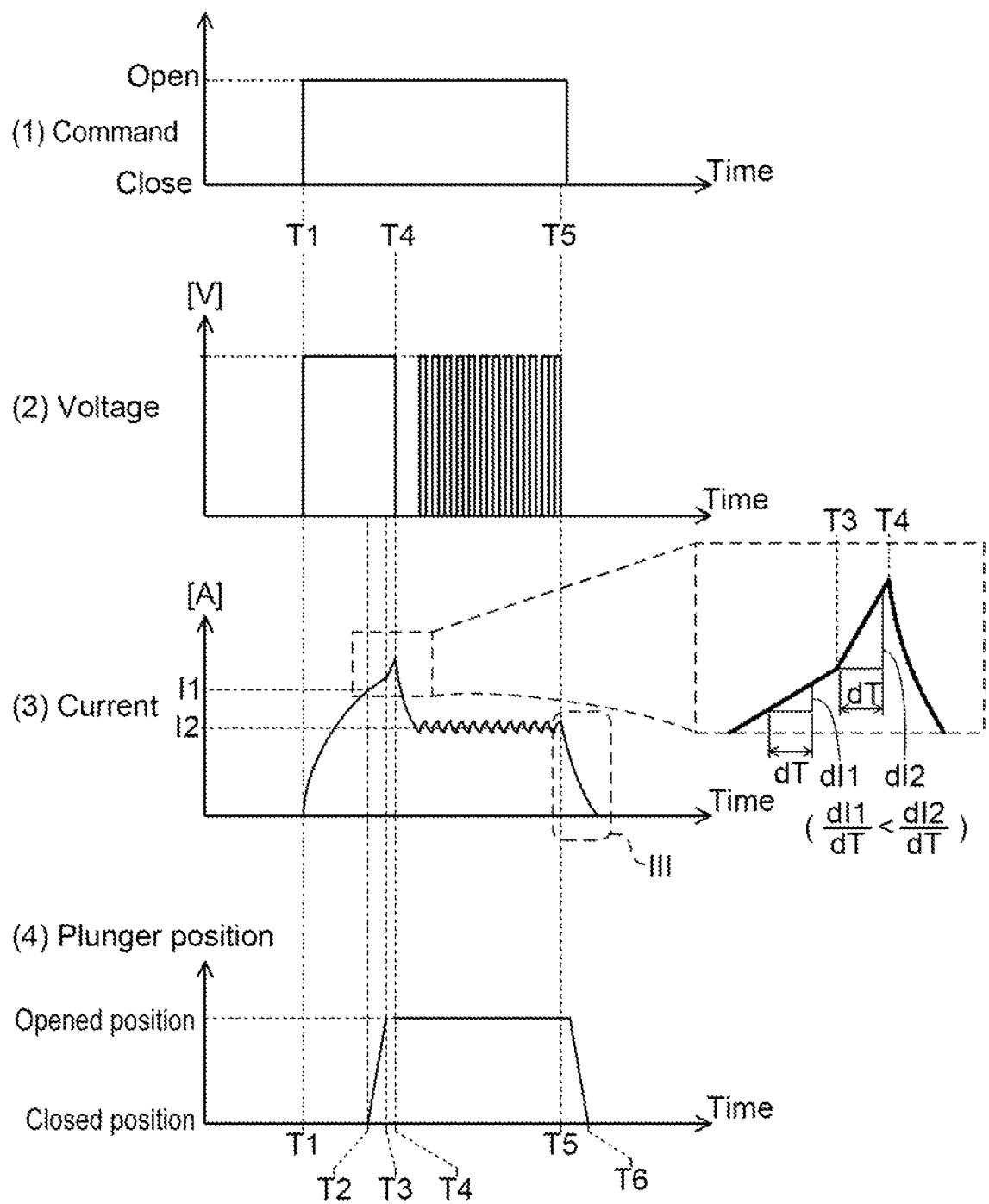
FIG. 2 shows time charts for a command, a voltage, a current, and a plunger position.

FIG. 2 shows time charts of various parameters of the hydrogen injector 10. Graph (1) in FIG. 2 shows commands transmitted by the main controller 5 to the injector controller 15. Until time T1, a command to keep the solenoid valve 12 closed is transmitted. From time T1 to time T5, a command to open, the solenoid valve 12 is transmitted. From time T5, the command to keep the solenoid valve 12 closed is transmitted again.

Graph (2) in FIG. 2 shows a voltage applied to the coil 13 by the injector controller 15. When receiving the command to open the solenoid valve 12 at time T1, the injector controller 15 applies a voltage to the coil 13. From time T1 to time T4, the voltage is applied at a duty cycle 100% over a time period long enough for the plunger to move up to the opened position. In other words, from time T1 to time T4, the injector controller 15 continuously applies a constant voltage to the coil 13.

In FIG. 2, graph (3) shows a current flowing in the coil 13, and graph (4) shows positions of the plunger. The voltage is applied to the coil 13 at time T1, thus a current starts flowing in the coil 13 from time T1. The current gradually increases. For a while from time T1, the plunger does not move (the plunger remains in the closed position).

At time T2, the supply current to the coil 13 reaches the first, current value I1. The plunger starts moving at time T2, and reaches the opened position at time T3. As the plunger starts moving, the hydrogen gas starts being injected from the solenoid valve 12 (i.e., the hydrogen injector 10). At the injection, the pressure of the hydrogen gas is reduced and its temperature thus sharply decreases. When the cold hydrogen gas passes through an infection side of the solenoid valve 12, the solenoid valve 12 is thereby cooled and the coil 13 is also cooled at the same time. When the temperature of the coil 13 decreases, the electrical resistance of the coil 13 also decreases. Since the constant voltage is applied to the coil 13, the decrease in the electrical resistance of the coil 13 facilitates the flow of the current. This increases a time rate of change of the current flowing in the coil 13. FIG. 2 shows, on the right side of graph (3), an enlarged diagram of the current graph around times T2, T3 and T4. Before time T3, the rate of change of the current is dI1/dT. From time T3 to time T4, the rate of change of the current increases to dI2/dT (>dI1/dT) because the coil 13 is cooled. That is, it can he determined that the solenoid valve 12 has opened based on the increase in the rate of change of the current flowing in the coil 13.

The injector controller 15 monitors the current flowing in the coil 13 by the current sensor 14. The injector controller 15 calculates a rate of change of the current from measurements obtained from the current sensor 14. When the rate of change of the current increases (e.g., the rate of change increases from dI1/dT to dI2/dT) during the supply of the current of the first current value or greater, the injector controller 15 determines that the solenoid valve 12 has opened. The injector controller 15 detects an increase in the rate of change of the current (i.e., detects that the solenoid valve 12 has opened) at time T4, and then decreases the supply current to the coil 13 to the second current value (second current value I2 in FIG. 2). The second current value is set at a current value required to keep the plunger at the opened position. When detecting that the plunger has moved to the opened position (i.e., detecting that the solenoid valve 12 has opened), the injector controller 15 immediately decreases the supply current to the coil 13 to the second current value. Decreasing the supply current to the coil 13 immediately after the solenoid valve 12 has opened reduces electric power consumption.

The injector controller 15 supplies the current of the second current value to the coil 13 by applying a pulse voltage. Supplying the current of the second current value by applying pulse voltage also helps to reduce electric power consumption.

At time T5, the command from the main controller 5 changes from the command to open the solenoid valve 12 to the command to keep the solenoid valve 12 closed. When receiving the command, the injector controller 15 stops the voltage application to the coil 13 at time T5. After time T5, the current flowing in the coil 13 decreases, and the plunger returns to the closed position at time T6. In other words, the solenoid valve 12 closes at time T6.

Figure 3:
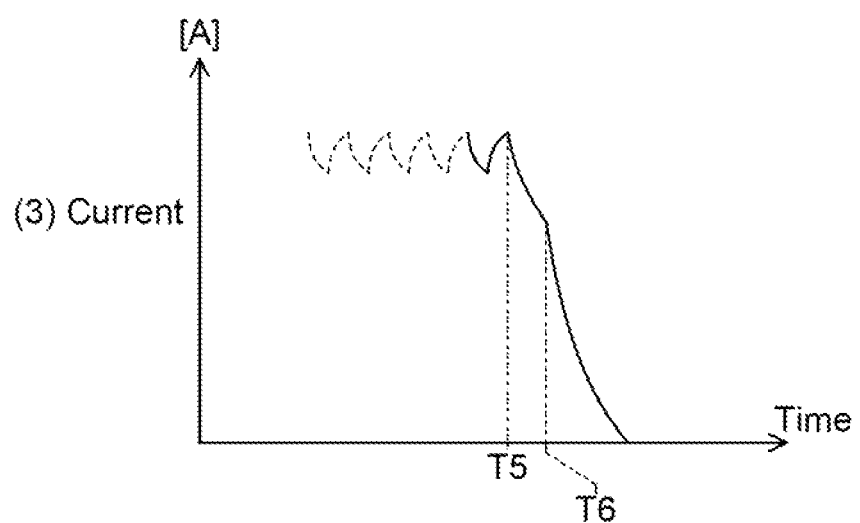
FIG. 3 is an enlarged diagram of a part III in FIG. 2.

FIG. 3 shows an enlarged diagram of a part III in FIG. 2, At time T5, the voltage application slops. After time T5, the current flowing in the coil 13 rapidly decreases, When the solenoid valve 12 closes at time T6, the injection of the pressure-reduced hydrogen gas stops. The stop of the injection of the pressure-reduced hydrogen gas means that the cooling of the solenoid valve 12 stops. Consequently, the temperature of the coil 13 increases, and the electrical resistance of the coil 13 also increases. Thus, the rate of change of the current flowing in the coil 13 changes at time T6. The injector controller 15 monitors the rate of change of the current also when the solenoid valve 12 closes. The injector controller 15 detects a timing (time T6) at Which the rate of change of the current changes after the stop of the voltage application to the coil 13, as a timing at which the solenoid valve 12 has closed.

The injector controller 15 identifies the time interval front time T3 to time T6 (i.e., the time interval from the timing at which the rate of change of the current changes first to the timing at which the rate of change changes next) as a duration during which the solenoid valve 12 is open. The duration during which the solenoid valve 12 is open is utilized for estimating a quantity of the hydrogen gas supplied to the fuel cell stack 3.

Some of the features characteristic to the hydrogen injector 10 of the embodiment will hereinafter be described. The hydrogen injector 10 includes the solenoid valve 12 and the coil 13. The solenoid valve 12 is configured to open when a current equal to or greater than a predetermined first current value is supplied to the coil 13. The solenoid valve 12 is configured to keep open while a current equal to or greater than a predetermined second current value is supplied to the coil 13. The second current value is smaller than the first current value. The main controller 5 configured to control the hydrogen injector 10 includes the current sensor 14 and the injector controller 15. When the injector controller 15 supplies a current equal to or greater than the first current value to the coil 13, the solenoid valve 12 opens. It is noted that the injector controller 15 supplies a current to the coil 13 with applying a constant voltage. When the current supply to the coil 13 is stopped, the solenoid valve 12 closes. The injector controller 15 monitors the rate of change of the current flowing in the coil 13 while supplying the current equal to or greater than the first current value to the coil 13. Upon when the rate of change of the current increases, the injector controller 15 decreases the supply current to the coil 13 to the second current value.

The technology disclosed herein utilizes a phenomenon that the temperature of high-pressure hydrogen gas sharply decreases when the pressure thereof is reduced. When, the solenoid valve opens, the pressure-reduced hydrogen gas (hydrogen gas whose temperature has decreased) is injected. The low-temperature hydrogen gas rapidly cools the solenoid valve and the coil. When the coil is cooled rapidly, its electrical resistance decreases. The temperature decreases in the coil to which a constant voltage is applied causes the time rate of change of the current to increase. By utilizing, the above-described phenomenon, the technology disclosed herein can determine a timing at which the solenoid valve (the hydrogen injector) opens. Decreasing the supply current to the coil at the determined timing reduces electric power consumption.

Specific examples of the present disclosure have been described in detail, however, these are mere exemplary indications and thus do not limit the scope of the claims. The art recited in the claims includes modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A fuel cell system, comprising:
a hydrogen injector comprising a solenoid valve connected to a hydrogen tank and a coil that opens the solenoid valve when a current flowing in the coil is equal to or greater than a first current value;
a current sensor that measures the current flowing in the coil; and
a controller that controls the current flowing in the coil, wherein the controller:
monitors, using the current sensor, a rate of change of the current flowing in the coil while controlling the current flowing in the coil to be equal to or greater than the first current value, and
decreases, in response to monitoring an increase in the rate of change of the current flowing in the coil, the current flowing in the coil to a second current value, the second current value being lower than the first current value.

2. The fuel cell system of claim 1, wherein the controlling of the current flowing in the coil to be equal to or greater than the first current value comprises applying a constant voltage to the coil.

3. The fuel cell system of claim 1, wherein the decreasing of the current flowing in the coil to the second current value comprises applying a pulse voltage to the coil.

4. The fuel cell system of claim 1, wherein the controller determines that the solenoid valve has opened in response to the monitoring of the increase in the rate of change of the current flowing in the coil.

* * * * *